United States Patent [19]
Krent et al.

[11] Patent Number: 4,843,524
[45] Date of Patent: Jun. 27, 1989

[54] ILLUMINATED DECORATIONS FOR FURNISHINGS AND OTHER LIKE STRUCTURES

[76] Inventors: Edward D. Krent, 207 Hampton Rd., Sharon, Mass. 02067; Nicholas B. Paffett, 250 Whitwell St., #3, Quincy, Mass. 02169

[21] Appl. No.: 191,307

[22] Filed: May 6, 1988

[51] Int. Cl.⁴ .............................................. A47B 97/00
[52] U.S. Cl. ...................................... 362/127; 362/31; 362/32; 362/294; 362/218; 362/806
[58] Field of Search .................... 362/26, 31, 32, 127, 362/218, 224, 260, 294, 134, 806

[56] References Cited
U.S. PATENT DOCUMENTS

| | | | |
|---|---|---|---|
| 3,802,708 | 4/1974 | Libert | 362/806 X |
| 4,188,654 | 2/1980 | Reich et al. | 362/32 |
| 4,745,525 | 5/1988 | Sheehy | 362/32 |

OTHER PUBLICATIONS

Mobay Corporation Information Sheet on LISA Plastics.
"Light-Emitting Plastics Challenge Neon", by Anne Watzmann, *Chemical Week*, Nov. 27, 1985, 2 pages.

*Primary Examiner*—Stephen F. Husar
*Attorney, Agent, or Firm*—Wolf, Greenfield & Sacks

[57] ABSTRACT

A furnishing or other like structure having an illuminated, decorative design formed on at least one surface thereof. The decorative design is created by a sheet or rod formed of a light transparent, fluorescent substance containing material, one edge of which extends through and is generally flush with the surface of the furnishing. This sheet or rod is illuminated along a lower portion thereof which extends below the surface of the furnishing. The lower portion of the rod or sheet, and the light source are shielded by a housing so that no light is visible, except along the illuminated edge on the surface of the furnishing. A fan or other cooling device may be provided for removing heat from the light source while still preventing the escape of light. Such sheets or rods may be provided either singly, or in a plurality to form the desired decorative design.

23 Claims, 6 Drawing Sheets

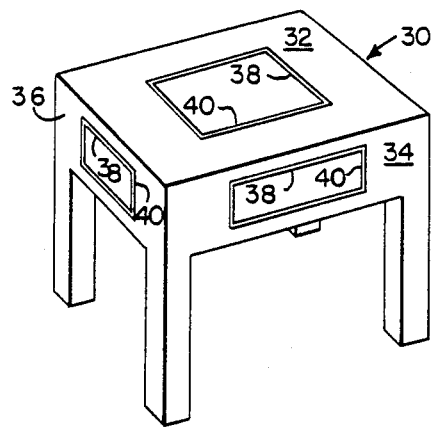
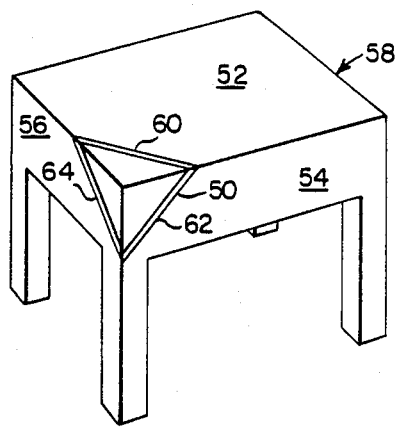
Fig. 5    Fig. 6
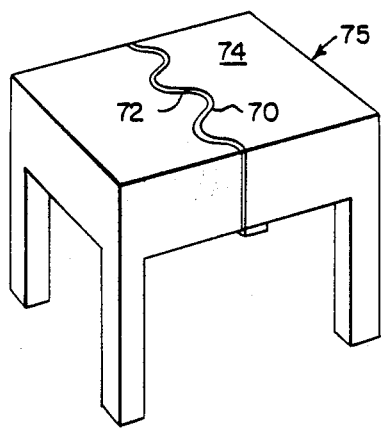
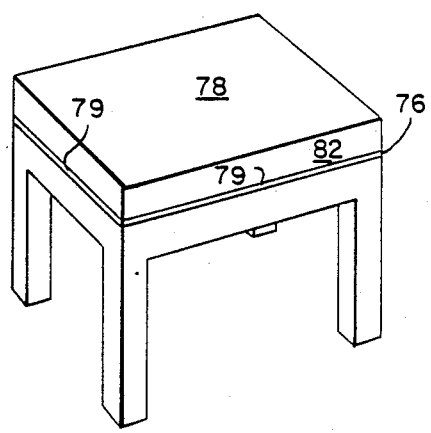
Fig. 7    Fig. 8

ILLUMINATED DECORATIONS FOR FURNISHINGS AND OTHER LIKE STRUCTURES

FIELD OF THE INVENTION

This invention relates generally to illuminated decorative designs for furnishings and other like structures and more particularly to designs formed using light transparent materials.

BACKGROUND OF THE INVENTION

It has long been recognized that certain types of transparent plastic materials, particularly acrylics, are light conducting along their length. It has also been recognized that when such light conducting plastics are formed in a sheet configuration, and are illuminated by a light source, light will travel along within the sheet, and will be visible along the edges thereof. These light conducting characteristics of certain plastics have been utilized previously in commercial displays and in other decorative and illuminating devices, such as those shown in U.S. Pat. Nos. 2,359,559 and 3,462,592. Fluorescent-dyed plastics are also known which absorb visible light and re-radiate this light at certain wavelengths as fluorescent light. When used in sheet form, the fluorescent light is collected and transmitted to the edges of sheets of plastic where it produces a bright area of illumination. Such plastics have been used for commercial displays, sculpture, jewelry and the like. Typically, fluorescent-dyed plastic materials have been employed in an interior setting and rely upon existing indirect, interior light to produce the desired effect.

Although the light conducting characteristics of the foregoing plastic materials have been previously used for commercial display purposes, it is believed that such light conducting plastics have not been previously used in conjunction with furnishings or other like structures to create illuminated, decorative designs on surfaces thereof which do not interfere with the normal use or functioning of such furnishings.

It is, therefore, a general object of the present invention to provide furnishings and other like structures with illuminated decorative designs on surfaces thereof which do not interfere with the normal use or functioning thereof.

It is another object of the present invention to provide furnishings and other like structures with illuminated, decorative designs of varying shapes and configurations.

It is another further object of the present invention to utilize certain light conducting plastics to create decorative, illuminated designs on the surfaces of furnishings and other like structures.

It is also another further object of the present invention to utilize certain light conducting plastics to produce decorative, illuminated designs on the surfaces of furnishings and other like structures without relying upon existing interior light.

SUMMARY OF THE INVENTION

In accordance with the above and other objects, this invention relates generally to furniture, furnishings and other like structures having illuminated, decorative designs formed on surfaces thereof utilizing light transparent materials which preferably contain a fluorescent substance, and a dedicated light source. In each of the embodiments of this invention, an element of a light transparent material, such as a fluorescent-dyed plastic, includes an edge portion and a lower portion. The edge portion thereof possesses the shape desired for the decorative design and is adapted to be embedded generally flush with a surface of the furnishing. The lower portion thereof extends in a direction generally normal to the surface of the furnishing. A dedicated light source is provided which emanates radiation at visible wavelengths. This light source illuminates the lower portion of the element only. Light from this light source is absorbed by the element and is re-radiated and conducted to the edge portion thereof from which it is emitted. The light transparent material usually is provided with a desired color. If needed, a cooling device, such as a fan, is provided in conjunction with the light source, to remove excess heat to prevent damage to the light conducting material, and to the furnishing. The light source is at least partially shielded to prevent excess light from being visible, except at the edge portion of the element.

In a preferred embodiment, the light transparent material is provided in elongated sheets. One edge of the sheet forms the edge portion, and part of the surface thereof forms the lower portion. The sheet may be flat or it may be deformed out of the plane of the sheet to provide a desired non-linear configuration to the edge of the sheet. Exemplary configurations include a wavy line, a circle or the like. In one embodiment, the furnishing or structure is a table, although other structures are included within the scope of this invention. The edge portion is adapted to be disposed flush with the top surface of the furnishing or structure, while the lower portion extends downwardly below the top surface. A light source is provided below the top surface, and is enclosed by a housing. Similar designs may also be provided along other surfaces of the furnishing or structure. In another variation, a sheet of light transparent material may be disposed in a position generally parallel to a top surface of a table but spaced therefrom, so that the edges thereof are visible along edges of the table. In other variations, several sheets of light transparent material are disposed at various angles with respect to one another to provide more complex designs.

In another embodiment of this invention, the light transparent material is in the form of a rod. In this embodiment, an end of the rod is adapted to project through a surface and to be flush with that surface of the furnishing or structure to form the edge portion. The rod is illuminated along its side and forms its lower portion. The rod may have a circular, or any other desired cross section. One rod may be used, or a plurality of rods may be used, so that the ends thereof, when positioned flush with a surface of the furnishing, produce a design. These rods are illuminated either by a single light source or by a plurality of light sources. The light sources are shielded and cooled as described for the sheet embodiment.

In a preferred embodiment, the light transparent material used for this invention is a fluorescent-dyed acrylic or polycarbonate, such as that sold under the trademark LISA by Mobay Corporation. Preferably, an incandescent light source is used, although a fluorescent source may be used also.

When the light source is properly shielded, the device of this invention provides a striking illuminated design on the surface of a table or other like structure which appears to be integral therewith and whose source of illumination cannot be readily ascertained.

DESCRIPTION OF THE DRAWINGS

The objects, advantages and features of this invention will be more clearly appreciated from the following detailed description when taken in conjunction with the accompanying drawings in which:

FIG. 5 is a perspective view showing one variation of the design for the embodiment illustrated in FIG. 2;

FIG. 6 is a perspective view showing another variation of the design for the embodiment illustrated in FIG. 2;

FIG. 7 is a perspective view showing another further variation of the design for the embodiment illustrated in FIG. 2;

FIG. 8 is a perspective view showing still another further variation of the design for the embodiment illustrated in FIG. 2;

DETAILED DESCRIPTION OF THE PREFERRED EMBODIMENTS

Figure 1:
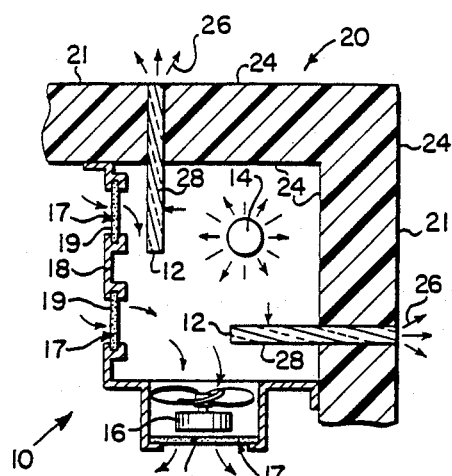
FIG. 1 is a schematic view showing the illuminated decorative device of this invention.

With reference now to the drawings, and more particularly to FIG. 1 thereof, the illuminated decorative device of this invention will be described. The decorative device of this invention typically is employed in conjunction with structures such as furniture or other furnishings with which an illuminated design can be used. For purposes of illustration only, this invention will be described with particular reference to a table or table top. However, it is to be understood that the scope of this invention is in no way so limited. This invention can be employed in conjunction with any other suitable furnishings, such as chairs, bureaus, bookcases, large appliances, such as refrigerators, stoves, washers, dryers and the like, and smaller appliances, such as clocks, toys and the like.

FIG. 1 illustrates in schematic form the elements of the invention when used in conjunction with a single surface, or in conjunction with two angularly disposed surfaces. Device 10 is mounted onto a structure 20 having at least one and, as illustrated in FIG. 1, possibly two walls 21. Device 10 of this invention includes one or more elements 12 formed of a light transparent material, one or more light sources 14, a cooling apparatus 16, and a housing 18 for shielding light source 14 and elements 12. Each of elements 12 extends from a bottom or unexposed side 22 of wall 21 through wall 21 to an exposed or visible side 24 of wall 21. Each element 12 includes an edge portion 26 and a lower portion 28. Typically, lower portion 28 is disposed generally normal to edge portion 26, although it need not be. Element 12 typically is oriented with respect to wall 21 so that lower portion 28 extends in a direction generally normal to side 24, although lower portion 28 could form any acute angle with respect to side 24 which is greater than about 10 degrees. Edge portion 26 is disposed along side 24 and is visible from side 24. Preferably, edge portion 26 is disposed flush with the surface of side 24. Lower portion 28 of element 12 has a sufficiently large dimension that it projects beyond side 22 and into a space below wall 21.

Light source 14 is positioned so that radiation emitted by it strikes lower portion 28. Preferably, the entire extent of lower portion 28 is directly and uniformly illuminated by light source 14. Light source 14 should be dedicated to the illumination of lower portion 28. Light source 14 may be positioned to illuminate a lower edge of lower portion 28, but preferably light source illuminates a broad, exposed surface of lower portion 28 in a direction generally normal thereto. Light source 14 may be any conventional light source, such as a fluorescent bulb or an incandescent bulb. Preferably, light source 14 is elongated and extends generally parallel to side 22 along the entire extent of lower portion 28. One source 14 may be used for both elements 12, where both elements can be uniformly illuminated by a single source, as illustrated in FIG. 1. However, more often a separate light source 14 should be used for each element 12. Light source 14 should be spaced sufficiently far from lower portion 28 so that it does not damage lower portion 28 and sufficiently close to lower portion 28 so that lower portion 28 is adequately and uniformly illuminated. For most applications, light source 14 should be spaced in the range of from about 1 inch to about 6 inches from lower portion 28.

Housing 18 surrounds both lower portion 28 and light source 14 to prevent the escape of light except through edge portion 26. Housing 18 may be formed of any material opaque to visible light, such as wood, metal, or the like.

Cooling apparatus 16 typically is a fan or some other device which removes heat generated by light source 14 to prevent the build up of heat adjacent light source 14 to prevent damage to the light source, to structure 20 or to element 12. Typically, cooling apparatus 16 is a low power electric fan which exhausts air from housing 18 through vents 17. Vents 17 typically include covers 19 formed of a material, such as an open cell foam, which is opaque to light but through which air may pass. In some applications of this invention, cooling apparatus 16 is not necessary, and can be elminated. For instance, if a fluorescent or other similar arc discharge type lamp is used, the heat generated thereby is substantially less than that produced by an incandescent bulb, and cooling means 16 may not be required. Additionally, if a low power light source is used, or a single low power lamp is provided, the heat generated thereby may not be sufficiently great to require cooling.

In a preferred embodiment, element 12 is formed of a light transparent, fluorescent substance containing material, such as a light transparent organic polymer or inorganic material. A preferred material is a fluorescent-dyed plastic. These light transparent, fluorescent-dyed plastics presently are available either as an acrylic or a polycarbonate, and are available in a wide variety of colors. One acceptable, commercially available example of a fluorescent-dyed plastic is sold under the trademark LISA in the United States by Mobay Corporation, Pittsburgh, Pa. 15205.

Such light transparent, fluorescent substance containing materials absorb direct or diffused light from the environment. Incident light striking the surface of lower portion 28 is refracted because of the higher refractive index of the material as compared with air. Part of the light in the visible range (400–700 nanometers) is absorbed by the fluorescent dyestuff in the material. After about $10^9$ sec., the absorbed light energy is emitted as fluorescent light in a random direction within the material. The rest of the unabsorbed light provides the element 12 with its color. Part of the re-emitted light which reaches the material-air interface at an angle smaller than the angle required for total reflection will be refracted and will exit element 12. The rest of the re-emitted light is totally reflected by the material-air interface, is collected and is transmitted to the edges. The extreme brightness of the edges is a result of lighting the element 12 along an exposed, broad surface of lower portion 28. Since lower portion 28 which absorbs light from light source 14 is larger in area than edge portion 26 which emits the light, the light emitted along edge portion is concentrated and has an intensity greater than that of light source 14. If the concentration of dyestuff in the material is uniform throughout, the depth of color of element 12 is a function of the thickness thereof. The greater the thickness of element 12, the greater is its depth of color. Once light source 14 is removed or turned off, this process of absorption and re-emission by element 12 ceases.

The intensity of the light emitted along edge portion 26 of element 12 is a function of the following: the intensity of the light striking element 12 from light source 14, the ratio of the area of lower portion 28 which collects light from light source 14 to the area of edge portion 26, the surface quality of element 12, and any impurities produced during processing of element 12. Obviously, the greater the intensity of the light emitted by light source 14, the greater is the intensity of light emitted by edge portion 26. Also, the larger the surface area of lower portion 28, the greater is the intensity of the light emitted by edge portion 26 as discussed. The surfaces of lower portion 28 should be kept as smooth as possible, so that a minimum amount of light is scattered, and a maximum amount of light is absorbed or passes into element 12. Also, smoother surfaces will permit better reflection of light from the material-air interface within element 12 and better transmission thereof to edge portion 26. Finally, the fewer the impurities, the more intense the light will be at edge portion 26

Figure 2:
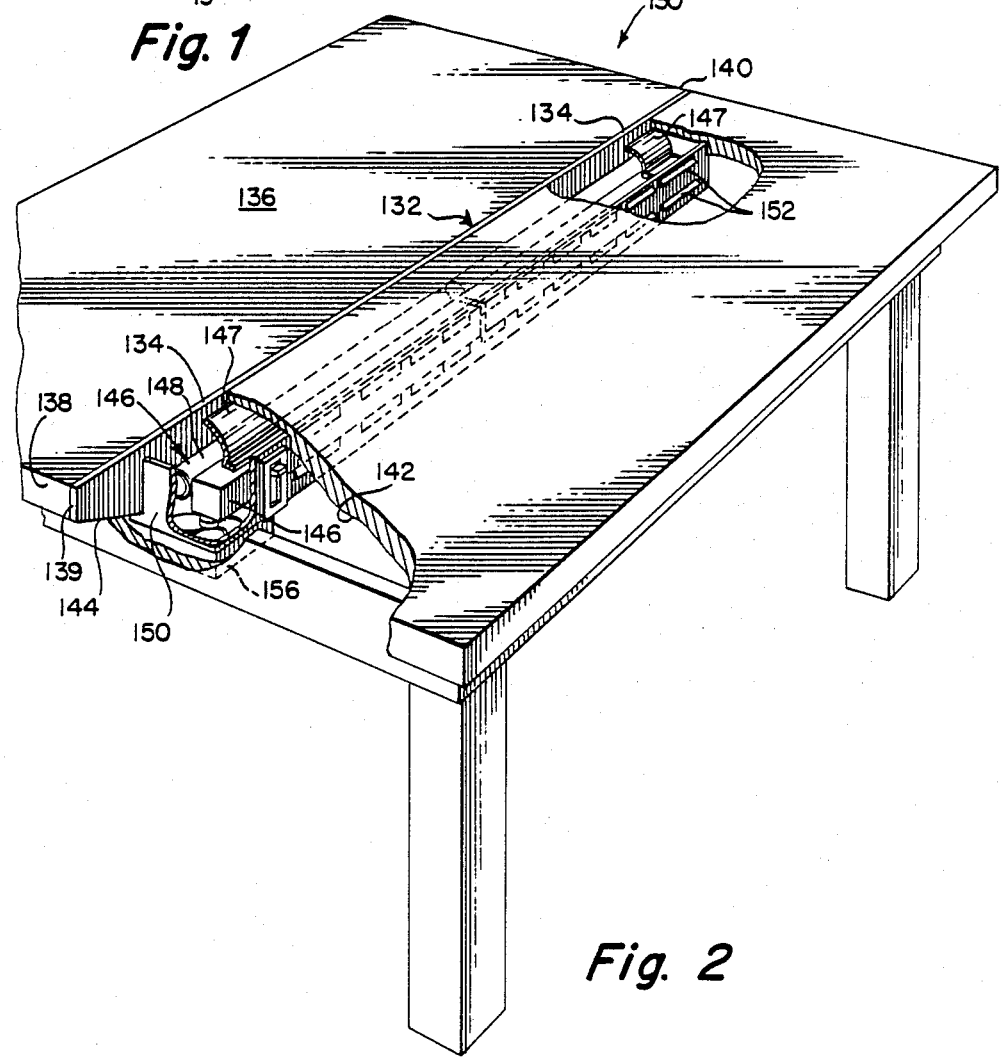
FIG. 2 is a partially cutaway, perspective view showing one embodiment of the illuminated decorative device of FIG. 1.
Figure 3:
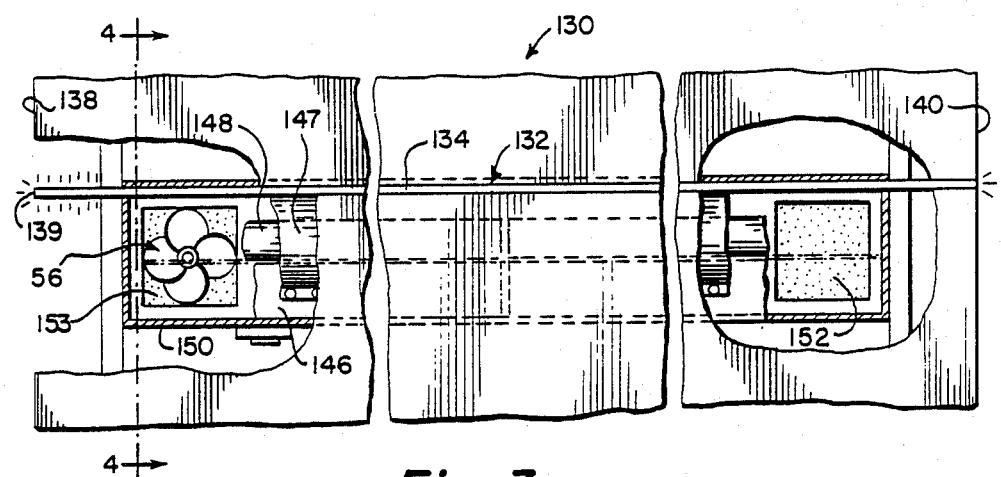
FIG. 3 is a partially cutaway top view of the device of FIG. 2.
Figure 4:
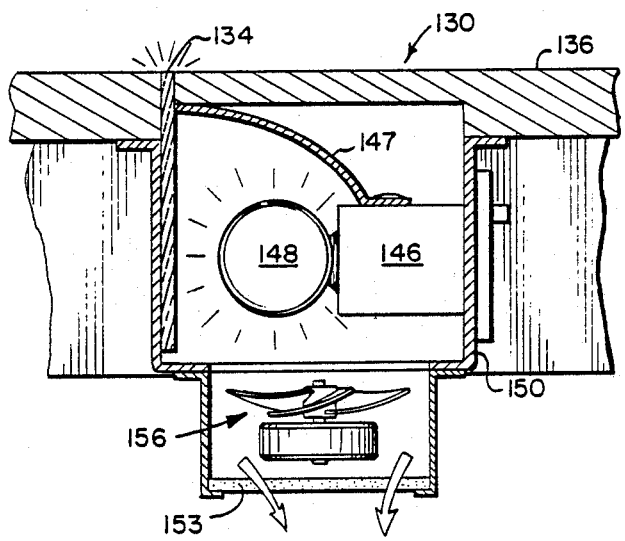
FIG. 4 is a cross-sectional view taken along the line 4—4 of FIG. 3.

An exemplary embodiment of this invention showing element 12 as a sheet of material will now be described with particular reference to FIGS. 2-4. For purposes of illustration only, FIGS. 2-4 show element 132 as a single, generally planar sheet. However, it is understood that element 132 could have a number of other configurations, as will be described. Also, FIGS. 2-4 show the device of this invention used in conjunction with a table 130. However, as previously described, table 130 is used for purposes of illustration only.

FIGS. 2-4 show a table 130 having a sheet 132 embedded therein. Edge portion 134 of sheet 132 is visible along an upper surface 136 of table 130. Edge portion 134 is preferably generally flush with upper surface 136. Since sheet 132 is shown as a generally planar sheet, edge portion 134 consequently has a generally linear configuration. Sheet 132 typically extends all the way across one dimension of table 132, from one side 138 to an opposite side 140 thereof. Sheet 132 is also shown to be visible along sides 138 and 140 of table 130 to form additional edge portions 139 extending along sides 138 and 140.

A lower portion 144 of sheet 132 extends below a lower surface 142 of table 130 a predetermined distance. The extent to which lower portion 144 extends below lower surface 142 depends on the intensity level desired for the light along edge portion 134. As discussed, the greater the distance lower portion 144 extends below lower surface 142, the more intense is the light emitted along edge portion 134 for a given intensity of the light source, and vice versa. However, lower portion 144 should not extend so far below lower surface 142 that it would interfere with the normal use of the table. Typically, for most applications, lower portion 144 extends in the range of from about one inch to about six inches below lower surface 142.

Extending along the entire length of lower portion 144 from side 138 to side 140 is a light source 146. Light source 146 typically includes one elongated bulb 148, or it may include a plurality of such bulbs 148 extending in an end to end relationship. Associated with light source 146 is a reflector 147. Reflector 147 typically is formed of a polished metal and extends the length of light source 146. Reflector 147 directs light toward lower portion 144, helps utilize the light more efficiently and prevents the escape of light from housing 150. One reflector 147 is shown disposed on one side of bulb 148, but two reflectors 147, one on each side of bulb 147, could be used. Also, one reflector surrounding light source 146 on a side thereof opposite of lower portion 144 could be provided.

Housing 150 surrounds at least a portion of lower portion 144 of sheet 132 as well as light source 146. Preferably, housing 150, together with surface 142 completely encloses light source 146 and lower portion 144. Housing 150 is elongated, and extends along the entire length of lower portion 144 and light source 146 between sides 138 and 140. Housing 150 is sufficiently wide to cover both light source 146 and lower portion 144. Housing 150 should be formed of a material opaque to visible light such as metal or wood. Housing 150 prevents the escape of light from light source 146, except along edge portion 134 of sheet 132. In this way, stray light from light source 146 does not interfere with the dramatic effect produced by edge portion 134.

Vents 152 are provided in housing 150 to permit the circulation of air through housing 150 to remove heat from light source 146. Vents 152 are particularly important, if incandescent bulbs are used. Vents 152 typically are disposed at various points along housing 150 and include covers 154 which permit air but no light to pass through vents 152. Typically, covers 154 comprise a layer of an open cell foam. A fan 156 is preferably, although not necessarily, provided in housing 152 to circulate air around light source 146 to remove heat therefrom. Fan 156 typically exhausts air from within housing 150 through vent 153 adjacent thereto, and draws air into housing 150 through vents 152. Fan 156 may be any suitable, low power electric fan. One or more fans could be required, depending upon the length of housing 150.

Means 158 for varying the intensity of light source 146 are also preferably provided. Where light source 146 includes incandescent bulbs, a common rheostat typically is used. In this way, the intensity of the light emitted by edge portion 134 can be varied as desired, depending upon the ambient light in the room and depending upon the intensity desired.

Figure 9:
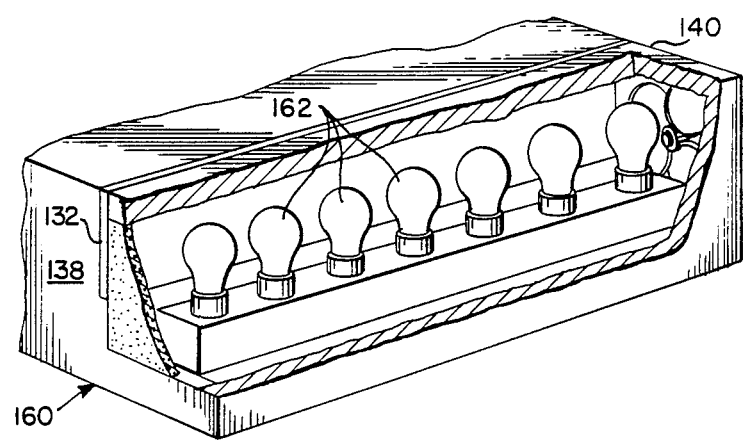
FIG. 9 is a partially cutaway, perspective view showing another embodiment of the light source for the illuminated decorative device of this invention.

An alternative embodiment for light source 146 is shown in FIG. 9. Light source 160 of FIG. 9 comprises a plurality of discrete, incandescent bulbs 162 equally spaced along the extent of sheet 132 from side 138 to side 140 and spaced from sheet 132 a desired distance. For most applications, an elongated bulb 148 is preferred, since it provides uniform lighting of edge portion 134 along its entire length. However, in certain applications, discrete bulbs are suitable, if it is desired to alternate brighter, more intensely lighted zones with darkened or shaded zones along edge portion 134. In addition, if desired, bulbs 162 can be lighted sequentially in a reoccurring pattern in a known manner to provide the illusion of light pulses traveling along edge portion 134.

Figure 10:
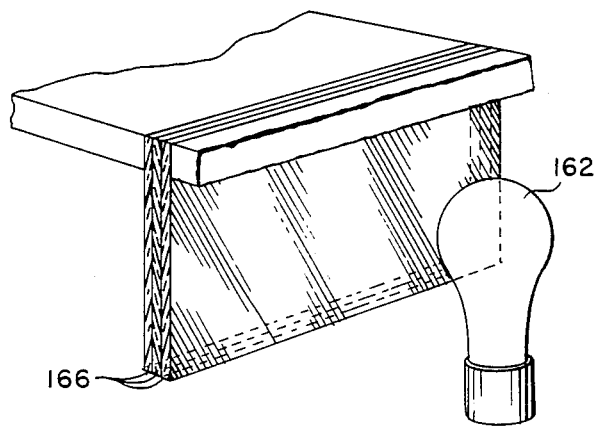
FIG. 10 is a perspective view showing another embodiment of the illuminated, decorative device of this invention.

In another embodiment, as shown in FIG. 10, sheet 132 may comprise a plurality of layers 166. Layers 166 may be of different colors or thickness or of the same color or thickness. However, all of layers 166 should be formed of a light transparent, fluorescent substance containing material. Layers 166 may be held together mechanically, such as with a clamp, or they may be bonded together with a light transparent adhesive.

Variations of the embodiment using sheets of materials are illustrated in FIGS. 5-9. FIG. 5 illustrates one variation of this embodiment in which a plurality of sheets is used to form rectangular designs on the surfaces of a table 30. One design is formed on top surface 32 of table 30. Another design is formed on opposed side surfaces 34 of table 30, while a third design is formed on opposed side surface 36 of table 30. Each of these designs can be the same or different. Each design on surfaces 32, 34 and 36 of table 30 utilizes four perpendicularly oriented sheets 38 having visible edge portions 40 which preferably are disposed flush with their associated surface 32, 34 and 36. Sheets 38 are each illuminated by a light source (not shown), and are shielded by a housing (not shown), all as previously described.

Another version of this embodiment using sheets of materials will now be described with particular reference to FIG. 6. The design of FIG. 6 can be provided by a single sheet 50 which intersects each of surfaces 52, 54 and 56 of table 58 to form respective edge portions 60, 62 and 64. Since sheet 50 is disposed at an acute angle with respect to each of surfaces 52, 54 and 56, respective edge portions 60, 62 and 64 are also disposed at an acute angle with respect to at least one generally planar surface of sheet 50. Preferably, again, edge portions 60, 62 and 64 are flush with respect to surfaces 52, 54 and 56, although they need not be. Typically, edge portions 60, 62 and 64 are formed by cutting sheet 50 at the required angles along each edge so that the edge portions of 60, 62 and 64 are disposed parallel to respective surfaces 52, 54 and 56. A single source of illumination (not shown) is provided as described for illumination of all of edge portions 60, 62 and 64, and a housing (not shown) is also used to shield the source of illumination.

FIGS. 7 and 8 show other variations of this embodiment of the invention using a sheet of material. In FIG. 7, sheet 70 is deformed out of the plane of its original flat configuration to form waves that repeat themselves at regular intervals. Sheet 70 is oriented with respect to top surface 74 of table 75 so that exposed edge portion 72 of sheet 70 displays the desired decorative design. Sheet 70 could be aligned in any angle with respect to surface 74, depending upon the desired shape of edge portion 72. For purposes of illustration only, in FIG. 7, sheet 70 is shown as being aligned perpendicular to surface 74, and edge portion 72 lies in an imaginary plane which is perpendicular to sheet 70 at all points and which is generally perpendicular to the direction of propagation of the waves formed in sheet 70, so that exposed edge portion 72 has a somewhat sinusoidal shape. Again, typically, edge portion 72 is flush with surface 74. An illumination source, a housing and cooling means, none of which is shown, are typically provided as described with respect to FIGS. 1-4.

In FIG. 8, a single, generally planar sheet 76 is disposed generally parallel to upper surface 78 of the table and slices through the table at a position spaced below surface 78 to produce edge portions 79 disposed along side surfaces 82 of the table. Sheet 76 is again illuminated, shielded and cooled in accordance with the embodiment of FIGS. 1-4.

Figure 11:
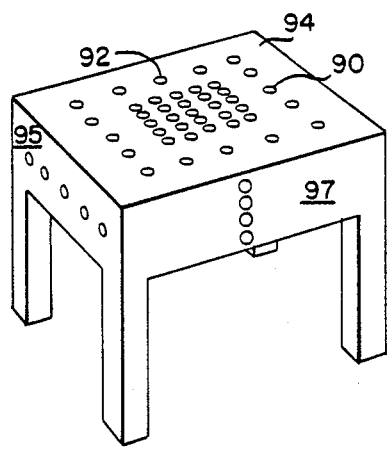
FIG. 11 is a partial perspective view showing another embodiment used with this invention.
Figure 11A:
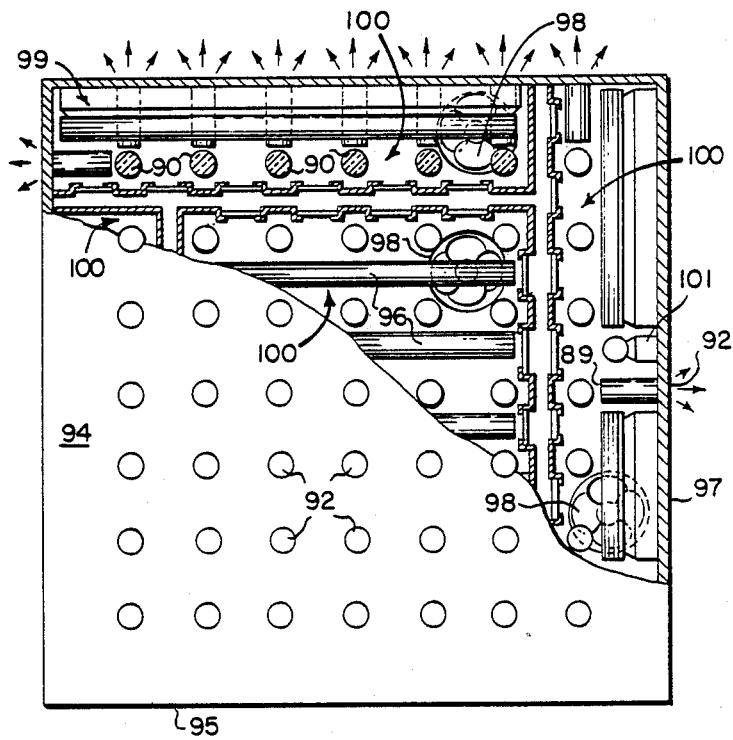
FIG. 11A is a partially cutaway top view of the embodiment of FIG. 11.
Figure 11B:
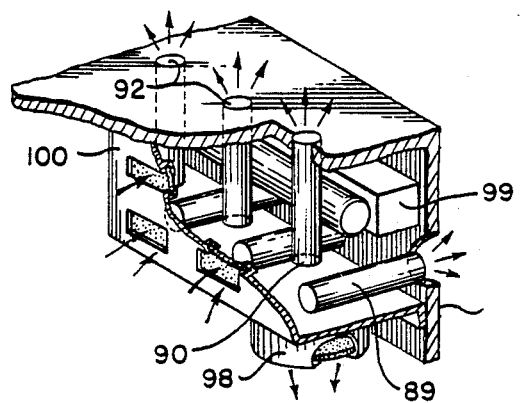
FIG. 11B is a partially cutaway perspective view of the embodiment of FIG. 11.

Another embodiment of this invention will now be described with particular reference to FIGS. 11, 11A and 11B. In the embodiment of FIG. 11, the decorative effect is produced not by sheets, as previously described, but by shafts or rods 90 which comprise the elements of light transparent material previously described. Rods 90 could be of any diameter, and could even comprise fiber optic bundles or a single glass fiber. One or a plurality of such rods 90 can be employed to produce the desired decorative effect. Each rod 90 comprises an end portion 92 and a lower portion 89. Lower portion 89 of each rod 90 extends below and is shielded from an associated surface 94, 95 or 97. End portion 92 of each rod 90 has a desired cross sectional shape, depending upon the design which is to be produced. In the example shown in FIG. 11, rods 90 are provided with a circular cross sectional shape. However, other cross sectional shapes could be used, such as, for example, a triangular shape, a rectangular shape, an octagonal shape, a hexagonal shape, an eliptical shape, or some irregular shape. Each lower portion 89 extends in a direction generally perpendicular to the surface 94, 95 or 97 with which it is associated, and end portion 92 of each rod 90 is visible on an associated surface 94, 95 or 97, and is preferably flush therewith. End portions 92 can be arranged in any desired design or shape to produce the decorative effect desired. The arrangement shown in FIG. 11 is exemplary only, and the invention is not limited by the particular arrangement shown therein. Alternatively, rods 90 could be disposed at an acute angle with respect to surfaces 94, 94 or 97 to provide a different cross sectional shape to end portions 92.

Lower portions 89 of rods 90 are illuminated by one or more light sources 96, 99 and 101 as shown. In the preferred embodiment shown in FIGS. 11A and 11B rods 90 are illuminated along the outer, longitudinally extending surface of lower portion 89. However, rods 90 could also be illuminated only at the lower ends of lower portion 89. Typically, a separate light source 96, 99 and 101 is used for the rods on each surface 94, 95 and 97, respectively. Light sources 96, 99 and 101 each may be a single fluorescent or incandescent bulb, or a plurality of such bulbs, depending on the particular needs of the furnishing. Light sources 96, 99 and 101 should be located so that they provide light of substantially equal intensity for all of rods 90. In the example of FIG. 11, light sources 99 and 101 each comprise a single, elongated, incandescent bulb which extends along and parallel to the line formed by aligned rods 90 on respective surfaces 95 and 97. In order to provide equal illumination of rods 90 on surface 94, many light sources 96 may be required, because lower portions 89 of rods 90 tend to have a shadowing effect on one another, and a rod which is disposed behind another rod with respect to a single light source may receive less light than the other rod. As shown in FIG. 11, preferably, light source 96 comprises a plurality of incandescent light sources which are arranged about and among lower portions 89 along surface 94 to provide substantially equal illumination of all rods 90.

Lower portions 89 of rods 90 on each surface 94, 95 and 97 are surrounded by a housing 100 to prevent the escape of light except through end portions 92. Each housing 100 includes a cooling device 98, such as a fan, which is used to circulate air about associated light sources 96, 99 and 101 to remove heat therefrom and to prevent damage to the light sources, or to rods 90.

Figure 12:
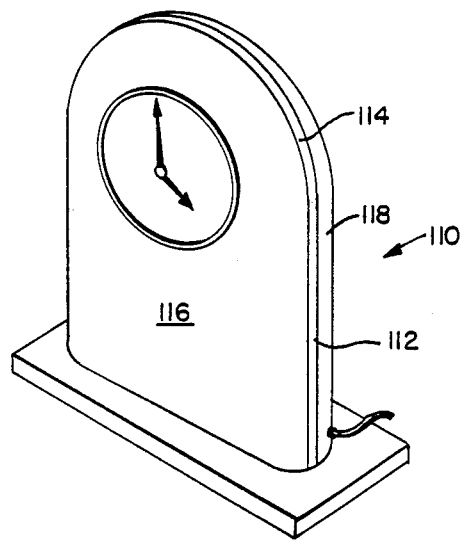
FIG. 12 is a perspective view showing another further embodiment of the illuminated decorative device of this invention.

Another embodiment of this invention will now be described with particular reference to FIG. 12. FIG. 12 shows the application of this invention to a clock 110. However, it is to be understood that a clock is used in FIG. 12 for purposes of illustration only and that the invention is not limited for use with clocks, but has applicability to other small furnishings such as appliances and the like. Clock 110 is provided with a sheet 112 of a light transparent, fluorescent substance containing material, such as that previously described, which passes all the way through clock 110. Sheet 112 has an exposed edge portion 114 which appears along certain selected surfaces of clock 110. In this illustration, edge portion 114 extends around virtually the entire circumference of clock 110. This results from the orientation of sheet 112 which is disposed generally parallel to one face 116 of clock 110 and generally perpendicular to surfaces 118 surrounding face 116. Sheet 112 is illuminated by a single light source (not shown) which is disposed within clock 110 and which is positioned closely adjacent a surface of sheet 112 near the center of sheet 112. Light is transmitted from the light source throughout sheet 112 so that it is visible along the entire extent of edge portion 114. The central location of light source 120 provides most of edge portion 114 with a generally uniform intensity. Preferably, a low power light source is used, so that heat output is reduced to a minimum. Preferably, no cooling device is utilized, although one could be. The outer casing of the clock 110 provides the necessary shielding for light source 120.

In using this invention, the sheet or rod having the desired shape or cross section is first formed in a conventional manner. Thereafter, a slot or hole is cut in the table or other furnishing conforming to the shape of the edge portion of the sheet or rod which is to be exposed. Then, the sheet or rod is secured in place with the edge portion being visible along the cut made in the surface of the furnishing. Typically, the edge portion is buffed smooth and flush with the surface. The rod or sheet should thereafter be secured in place, typically through the use of glue. Supports may be provided below the sheet or rod to retain it in place. Thereafter, the required housing and cooling elements are installed.

In view of the above description, it is likely that modifications and improvements may occur to those skilled in the art which are within the scope of this invention. Thus, the above description is intended to be exemplary only, the scope of the invention being defined by the following claims and their equivalents.

What is claimed is:

1. A structure having an illuminated design formed on an upper surface thereof, said structure comprising:
   a light opaque structural member, said structural member having the upper surface formed thereon and a lower surface;
   an element formed of a light transparent, fluorescent substance containing material extending through said structural member from said lower surface to said upper surface, said element having an edge disposed generally flush with said upper surface and a lower portion extending from said lower surface away from said upper surface;
   means disposed on a side of said structural member adjacent said lower surface for illuminating said lower portion; and
   a housing surrounding at least a portion of said lower portion of said element and said illuminating means to prevent light from said illuminating means from being visible except along said edge of said element.

2. A structure as recited in claim 1 wherein said element is comprised of a fluorescent-dyed plastic.

3. A structure as recited in claim 1 wherein said illuminating means illuminates said lower portion of said element along a surface thereof which is generally normal to said upper surface of said structure.

4. A structure as recited in claim 1 further comprising means for removing heat from said illuminating means.

5. A structure as recited in claim 2 wherein said element is comprised of a transparent acrylic which has been dyed a desired color.

6. A structure as recited in claim 2 wherein said element is comprised of a transparent polycarbonate which has been dyed a desired color.

7. A structure as recited in claim 1 further comprising means for varying the intensity of the light emitted by said illuminating means.

8. A structure as recited in claim 1 wherein said element is formed as a sheet, and wherein said element extends at least part way across one dimension of said structural member, whereby said edge comprises one edge of said sheet.

9. A structure as recited in claim 8 wherein said illuminating means comprises an elongated bulb which extends generally parallel to said upper surface and which is generally coextensive with the extent of said lower portion along said one dimension of said structural member, said bulb being in confronting spaced relation along its length with said lower portion of said element.

10. A structure as recited in claim 8 wherein said illumination means comprises a plurality of discrete, incandescent bulbs spaced from said lower portion and extending at spaced intervals along said lower portion of said element, said bulbs being generally coextensive with the extent of said lower portion along said one dimension of said structural member.

11. A structure as recited in claim 4 wherein said heat removing means comprises:
   vents disposed in said housing;
   means covering said vents for permitting air to pass therethrough, but not light; and
   a fan disposed in said housing for circulating air past said illuminating means.

12. A structure as recited in claim 11 wherein said covering means comprises an open cell foam.

13. A structure as recited in claim 1 wherein said element is an elongated rod whose direction of elongation is generally normal to said upper surface, an end surface of said rod forming said edge of said element.

14. A structure as recited in claim 13 comprising a plurality of elements arranged so that the end portions thereof form a desired decorative design on said upper surface of said structure.

15. A structure as recited in claim 13 wherein said element is formed of a fluorescent-dyed acrylic material.

16. A structure as recited in claim 13 wherein said element is formed of a fluorescent-dyed polycarbonate material.

17. A structure as recited in claim 1 further comprising a plurality of said elements, said elements being arranged so that said edges thereof form a desired design on said upper surface of said structure.

18. A structure as recited in claim 1 wherein said element is formed of a plurality of layers which extend generally parallel to one another and in a direction generally normal to said upper surface of said structure, whereby each of said layers is visible along said edge portion, and wherein at least one of said layers is dyed a color different from another of said layers.

19. A structure as recited in claim 1 wherein said structural member has two, angularly disposed upper surfaces, and wherein said element passes through both of said upper surfaces, said element having one edge disposed generally flush with one of said upper surfaces, and another edge disposed generally flush with the other of said upper surfaces.

20. A structure as recited in claim 1 comprising a single element, and three angularly disposed upper surfaces, said element passing through each of said upper surfaces of said structure, said element having a first edge disposed generally flush with a first one of said upper surfaces, a second edge disposed generally flush with a second one of said upper surfaces, and a third edge disposed generally flush with a third one of said upper surfaces.

21. A structure as recited in claim 1 wherein the intensity of light emitted along said edge of said element is a function of the surface area of said lower portion of said element upon which light from said illuminating means impinges.

22. A structure as recited in claim 1 wherein said lower portion of said element extends below said lower surface of said structural member a distance in the range of from about one to about six inches.

23. A structure having an illuminated design formed on an upper surface thereof, said structure comprising:
   a light opaque structural member, said structural member having the upper surface formed thereon and a lower surface;
   a sheet formed of a fluorescent-dyed, light transparent plastic material extending through said structural member from said lower surface to said upper surface, said sheet having an edge disposed generally flush with said upper surface and a lower portion having a broad surface and extending from said lower surface away from said upper surface;
   means for illuminating the entire extent of said broad surface of said lower portion of said sheet in a direction generally normal thereto;
   a housing surrounding said lower portion of said sheet and said illuminating means; and
   means for removing heat from the interior of said housing.

* * * * *